United States Patent
Witt et al.

(10) Patent No.: US 12,141,580 B2
(45) Date of Patent: Nov. 12, 2024

(54) MICROPROCESSOR WITH NON-CACHEABLE MEMORY LOAD PREDICTION

(71) Applicant: Simplex Micro, Inc., San Jose, CA (US)

(72) Inventors: David Witt, Plano, TX (US); Thang Minh Tran, Tustin, CA (US)

(73) Assignee: Simplex Micro, Inc., Austin, TX (US)

( * ) Notice: Subject to any disclaimer, the term of this patent is extended or adjusted under 35 U.S.C. 154(b) by 0 days.

(21) Appl. No.: 17/725,342

(22) Filed: Apr. 20, 2022

(65) Prior Publication Data

US 2023/0342148 A1  Oct. 26, 2023

(51) Int. Cl.
- G06F 9/30 (2018.01)
- G06F 9/38 (2018.01)
- G06F 12/0811 (2016.01)

(52) U.S. Cl.
CPC ........ *G06F 9/30043* (2013.01); *G06F 9/3005* (2013.01); *G06F 9/30101* (2013.01); *G06F 9/3012* (2013.01); *G06F 9/30145* (2013.01); *G06F 9/3838* (2013.01); *G06F 12/0811* (2013.01); *G06F 2212/1024* (2013.01)

(58) Field of Classification Search
CPC ............. G06F 9/30043; G06F 9/30047; G06F 9/30101; G06F 9/3824; G06F 9/383; G06F 9/3832; G06F 9/3836; G06F 9/3838; G06F 9/3842

See application file for complete search history.

(56) References Cited

U.S. PATENT DOCUMENTS

| | | | |
|---|---|---|---|
| 5,021,985 | A | 6/1991 | Hu et al. |
| 5,185,868 | A | 2/1993 | Tran |
| 5,251,306 | A | 10/1993 | Tran |
| 5,655,096 | A | 8/1997 | Branigin |
| 5,699,536 | A | 12/1997 | Hopkins et al. |
| 5,799,163 | A | 8/1998 | Park et al. |

(Continued)

FOREIGN PATENT DOCUMENTS

| | | |
|---|---|---|
| EP | 0840213 A2 | 5/1998 |
| EP | 0902360 A2 | 3/1999 |

(Continued)

OTHER PUBLICATIONS

Diavastos, Andreas & Carlson, Trevor. (2021). Efficient Instruction Scheduling using Real-time Load Delay Tracking. (Year: 2021).*

(Continued)

*Primary Examiner* — Andrew Caldwell
*Assistant Examiner* — Kasim Alli
(74) *Attorney, Agent, or Firm* — Appleton Luff (57) ABSTRACT

A processor includes an instruction issue unit that receives a first instruction, and issues the first instruction with a write time, which for a load instruction corresponds to a data cache latency time or to a non-cacheable latency time of a non-cacheable predictor. The non-cacheable predictor includes a tag array and data array with a plurality of entries to predict non-cacheable latency times of non-cacheable load instructions. The non-cacheable predictor can be implemented as a direct map, an N-way associative cache, or a fully associative cache.

9 Claims, 7 Drawing Sheets

(56) References Cited

U.S. PATENT DOCUMENTS

| | | | |
|---|---|---|---|
| 5,802,386 A * | 9/1998 | Kahle | G06F 9/3836 |
| | | | 712/217 |
| 5,809,268 A | 9/1998 | Chan | |
| 5,835,745 A | 11/1998 | Sager et al. | |
| 5,860,018 A | 1/1999 | Panwar | |
| 5,881,302 A | 3/1999 | Omata | |
| 5,903,919 A | 5/1999 | Myers | |
| 5,958,041 A * | 9/1999 | Petolino, Jr. | G06F 9/30043 |
| | | | 712/214 |
| 5,961,630 A * | 10/1999 | Zaidi | G06F 9/384 |
| | | | 712/214 |
| 5,964,867 A * | 10/1999 | Anderson | G06F 9/383 |
| | | | 712/216 |
| 5,996,061 A * | 11/1999 | Lopez-Aguado | G06F 9/3832 |
| | | | 711/213 |
| 5,996,064 A | 11/1999 | Zaidi et al. | |
| 6,016,540 A | 1/2000 | Zaidi et al. | |
| 6,035,393 A * | 3/2000 | Glew | G06F 9/3861 |
| | | | 712/E9.055 |
| 6,065,105 A | 5/2000 | Zaidi et al. | |
| 6,247,113 B1 | 6/2001 | Jaggar | |
| 6,282,634 B1 | 8/2001 | Hinds et al. | |
| 6,304,955 B1 | 10/2001 | Arora | |
| 6,425,090 B1 | 7/2002 | Arimilli et al. | |
| 6,453,424 B1 | 9/2002 | Janniello | |
| 7,069,425 B1 | 6/2006 | Takahashi | |
| 7,434,032 B1 | 10/2008 | Coon et al. | |
| 8,166,281 B2 | 4/2012 | Gschwind et al. | |
| 9,256,428 B2 | 2/2016 | Heil et al. | |
| 10,339,095 B2 | 7/2019 | Moudgill et al. | |
| 11,062,200 B2 | 7/2021 | Lie et al. | |
| 11,132,199 B1 | 9/2021 | Tran | |
| 11,144,319 B1 | 10/2021 | Battle et al. | |
| 11,163,582 B1 | 11/2021 | Tran | |
| 11,204,770 B2 | 12/2021 | Tran | |
| 11,263,013 B2 | 3/2022 | Tran | |
| 12,061,906 B2 | 8/2024 | Stephens et al. | |
| 2001/0004755 A1 | 11/2001 | Levy et al. | |
| 2003/0023646 A1 | 1/2003 | Lin et al. | |
| 2003/0135712 A1 | 7/2003 | Theis | |
| 2004/0073779 A1 | 4/2004 | Hokenek et al. | |
| 2006/0010305 A1 | 1/2006 | Maeda et al. | |
| 2006/0095732 A1 | 5/2006 | Tran et al. | |
| 2006/0218124 A1 | 9/2006 | Williamson et al. | |
| 2006/0259800 A1 | 11/2006 | Maejima | |
| 2006/0288194 A1 | 12/2006 | Lewis et al. | |
| 2007/0038984 A1 | 2/2007 | Gschwind et al. | |
| 2007/0260856 A1 | 11/2007 | Tran et al. | |
| 2011/0099354 A1 | 4/2011 | Takashima et al. | |
| 2011/0320765 A1 | 12/2011 | Karkhanis et al. | |
| 2012/0047352 A1 | 2/2012 | Yamana | |
| 2013/0151816 A1 | 6/2013 | Indukuru et al. | |
| 2013/0297912 A1 | 11/2013 | Tran et al. | |
| 2013/0346985 A1 | 12/2013 | Nightingale | |
| 2014/0082626 A1 | 3/2014 | Busaba et al. | |
| 2015/0026435 A1 | 1/2015 | Muff et al. | |
| 2015/0212972 A1 | 7/2015 | Boettcher et al. | |
| 2015/0227369 A1 | 8/2015 | Gonion | |
| 2016/0092238 A1 | 3/2016 | Codrescu et al. | |
| 2016/0275043 A1 | 9/2016 | Grochowski et al. | |
| 2016/0371091 A1 | 12/2016 | Brownscheidle et al. | |
| 2017/0177354 A1 | 6/2017 | Ould-Ahmed-Vall | |
| 2017/0357513 A1 | 12/2017 | Ayub et al. | |
| 2018/0196678 A1 | 7/2018 | Thompto | |
| 2019/0079764 A1 | 3/2019 | Diamond et al. | |
| 2019/0243646 A1 | 8/2019 | Anderson | |
| 2020/0004534 A1 | 1/2020 | Gurram et al. | |
| 2020/0004543 A1 * | 1/2020 | Kumar | G06F 9/3844 |
| 2020/0319885 A1 | 10/2020 | Eyole et al. | |
| 2020/0387382 A1 | 12/2020 | Tseng et al. | |
| 2021/0026639 A1 | 1/2021 | Tekmen et al. | |
| 2021/0311743 A1 | 10/2021 | Tran | |
| 2023/0068637 A1 | 3/2023 | Feiste et al. | |
| 2023/0244490 A1 | 8/2023 | Tran | |
| 2023/0244491 A1 | 8/2023 | Tran | |

FOREIGN PATENT DOCUMENTS

| | | |
|---|---|---|
| EP | 0959575 A1 | 11/1999 |
| WO | 0010076 A1 | 2/2000 |
| WO | 0208894 A1 | 1/2002 |
| WO | 0213005 A1 | 2/2002 |

OTHER PUBLICATIONS

Choi, W., Park, SJ., Dubois, M. (2009). Accurate Instruction Pre-scheduling in Dynamically Scheduled Processors. In: Stenström, P. (eds) Transactions on High-Performance Embedded Architectures and Compilers II. Lecture Notes in Computer Science, vol. 5470. Springer, Berlin, Heidelberg. pp. 107-127. (Year: 2009).*

J. S. Hu, N. Vijaykrishnan and M. J. Irwin, "Exploring Wakeup-Free Instruction Scheduling," 10th International Symposium on High Performance Computer Architecture (HPCA'04), Madrid, Spain, pp. 232-232 (Year: 2004).*

U.S. Appl. No. 17/588,315, filed Jan. 30, 2022, Thang Minh Tran.

Written Opinion of the International Searching Authority, PCT/S2022/052185.

Written Opinion of the International Searching Authority, PCT/US2023/018970.

Written Opinion of the International Searching Authority, PCT/US2023/018996.

PCT/US2023/018996, Written Opinion of the International Preliminary Examining Authority, Apr. 8, 2024.

PCTUS2023081682, Written Opinion of the International Searching Authority, Mar. 22, 2024.

Written Opinion of the International Preliminary Examining Authority, PCTUS2023/018970, Mar. 25, 2024.

PCT/US23/27497: Written Opinion of the International Searching Authority.

PCT/US2023/018970, International Preliminary Report on Patentability, Jul. 18, 2024.

PCT/US2023/018996, International Preliminary Report on Patentability, Jul. 19, 2024.

* cited by examiner

Read Control

| Time | Reg | fwd valid |
|---|---|---|
| 127 | x0 | 0 |
| 126 | x0 | 0 |
| . | x27 | 1 |
| . | x11 | 0 |
| 27 | x7 | 1 |
| 26 | x27 | 0 |
| 25 | x5 | 1 |
| . | x0 | 0 |
| 2 | x0 | 0 |
| 1 | x0 | 0 |
| 0 | x0 | 0 | time count ↑ (at 25)

FIG. 6A

Write Control

| Time | Reg |
|---|---|
| 127 | x0 |
| 126 | x0 |
| . | x25 |
| . | x14 |
| 28 | x22 |
| 27 | x9 |
| 26 | x5 |
| . | x0 |
| 2 | x0 |
| 1 | x0 |
| 0 | x0 | time count ↑ (at 26)

MICROPROCESSOR WITH NON-CACHEABLE MEMORY LOAD PREDICTION

RELATED APPLICATIONS

This application is related to U.S. patent application Ser. No. 17/588,315, filed Jan. 30, 2011, and entitled "Microprocessor with Time Counter for Statically Dispatching Instructions," which application is hereby incorporated by reference in its entirety.

BACKGROUND

Technical Field

The present invention relates to the field of computer processors and more particularly to issuance and execution of instructions in computer processors.

Technical Background

Processors have become increasingly complex chasing small increments in performance at the expense of power consumption and semiconductor chip area. The approach in out-of-order (OOO) superscalar microprocessors has remained basically the same for the last 25-30 years, with much of the power dissipation arising from the dynamic scheduling of instructions for execution from the reservation stations or central windows. Designing an OOO superscalar microprocessor is a huge undertaking. Hundreds of instructions are issued to the execution pipeline where the data dependencies are resolved and arbitrated for execution by a large number of functional units. The result data from the functional units are again arbitrated for the write buses to write back to the register file. If the data cannot be written back to the register file, then the result data are kept in temporary registers and a complicated stalling procedure is performed for the execution pipeline.

The memory subsystem is important in computing platforms and crucial in performance of a microprocessor. The memory data is not always in the data cache but in external memory and this is particularly true for artificial intelligence and machine learning applications. Accessing memory data is performed through the load and store instructions in a computer architecture. With dynamic scheduling in a traditional microprocessor, the determination of the location of memory data is performed by way of the address calculation and access of the memory management unit. For load instructions, if the data is not in the cache, then the subsequent dependent instructions can be speculatively executed and replayed. These operations can increase throughput. A side effect of speculative and replay operations is increased power consumption. In addition to a cache miss as described above, certain data may not be in the cache due to its being stored in non-cacheable memory.

There is a need for a superscalar microprocessor, which may or may not support out of order execution, which consumes less power, has a simpler design, efficiently executes load instructions, and is scalable with consistently high performance.

SUMMARY

Most computer architectures employ two types of load instructions: a load with cacheable data and a load with non-cacheable data. The non-cacheable data is stored in external memory which includes input/output devices, close-couple memory, or specialized memories. The cacheable data can be stored in data caches which include level-1 (L2) data cache and possibly other levels of caches (level-2 (L2), etc.) external to the main microprocessor chip. The determination of the load data types is part of the memory address calculation and accessing of the memory management unit. The memory management unit may consist of the physical memory attribute (PMA) and physical memory protection (PMP) logic which specifies the memory address ranges for different memory types. In general, all load instructions assume the latency time of an L1 data cache hit which is correct about 80-90% of the time.

In certain disclosed embodiments, if the cacheable load data is not in the L1 data cache, then the load instructions are replayed with an L2 cache latency time, if an L2 cache exists. The non-cacheable load instructions are also replayed with various external fetch latency types depending on non-cacheable memory types. Fetching of non-cacheable memory data may be known from past load latency times or programmable fixed latencies. In a disclosed embodiment, a non-cacheable prediction is used to predict the latency time for a load instruction to avoid replay of load instructions and the subsequent dependent instructions on the non-cacheable load instruction.

In another embodiment, the non-cacheable predictor contains the load physical address of the non-cacheable loads. The non-cacheable fetch time is much longer than the data cache hit time. The load physical address is used to start an external memory data fetch ahead of time which is referred to as a non-cacheable load prefetch. The non-cacheable load prefetch is selective based on past history of any data dependency on non-cacheable stores.

The foregoing may be employed in multiple processor organizations but provides a particular benefit in a processor with a time counter and a method for statically dispatching instructions to an execution pipeline with preset execution times based on a time count from the counter. Such a processor employs static scheduling of instructions. A static scheduling algorithm is based on the assumption that a new instruction has a perfect view of all previous instructions in the execution pipeline, and thus it can be scheduled for execution at an exact time in the future, e.g., with reference to a time count from a counter. Assuming an instruction has 2 source operands and 1 destination operand, the instruction can be executed out-of-order when conditions are met of (1) no data dependency, (2) availability of read buses to read data from the register file, (3) availability of a functional unit to execute the instruction, and (4) availability of a write bus to write result data back to the register file.

BRIEF DESCRIPTION OF THE DRAWINGS

Aspects of the present invention are best understood from the following description when read with the accompanying figures.

DETAILED DESCRIPTION

The following description provides different embodiments for implementing aspects of the present invention. Specific examples of components and arrangements are described below to simplify the explanation. These are merely examples and are not intended to be limiting. For example, the description of a first component coupled to a second component includes embodiments in which the two components are directly connected, as well as embodiments in which an additional component is disposed between the first and second components. In addition, the present disclosure repeats reference numerals in various examples. This repetition is for the purpose of clarity and does not in itself require an identical relationship between the embodiments.

In one embodiment a processor is provided, typically implemented as a microprocessor, that schedules instructions to be executed at a preset time based on a time count from a time counter. In such a microprocessor the instructions are scheduled to be executed using the known throughput and latency of each instruction to be executed. For example, in one embodiment, the ALU instructions have throughput and latency times of 1, the multiply instructions have throughput time of 1 and the latency time of 2, the load instructions have the throughput time of 1 and latency time of 3 (based on a data cache hit), and the divide instruction have throughput and latency times of 32.

Figure 1:
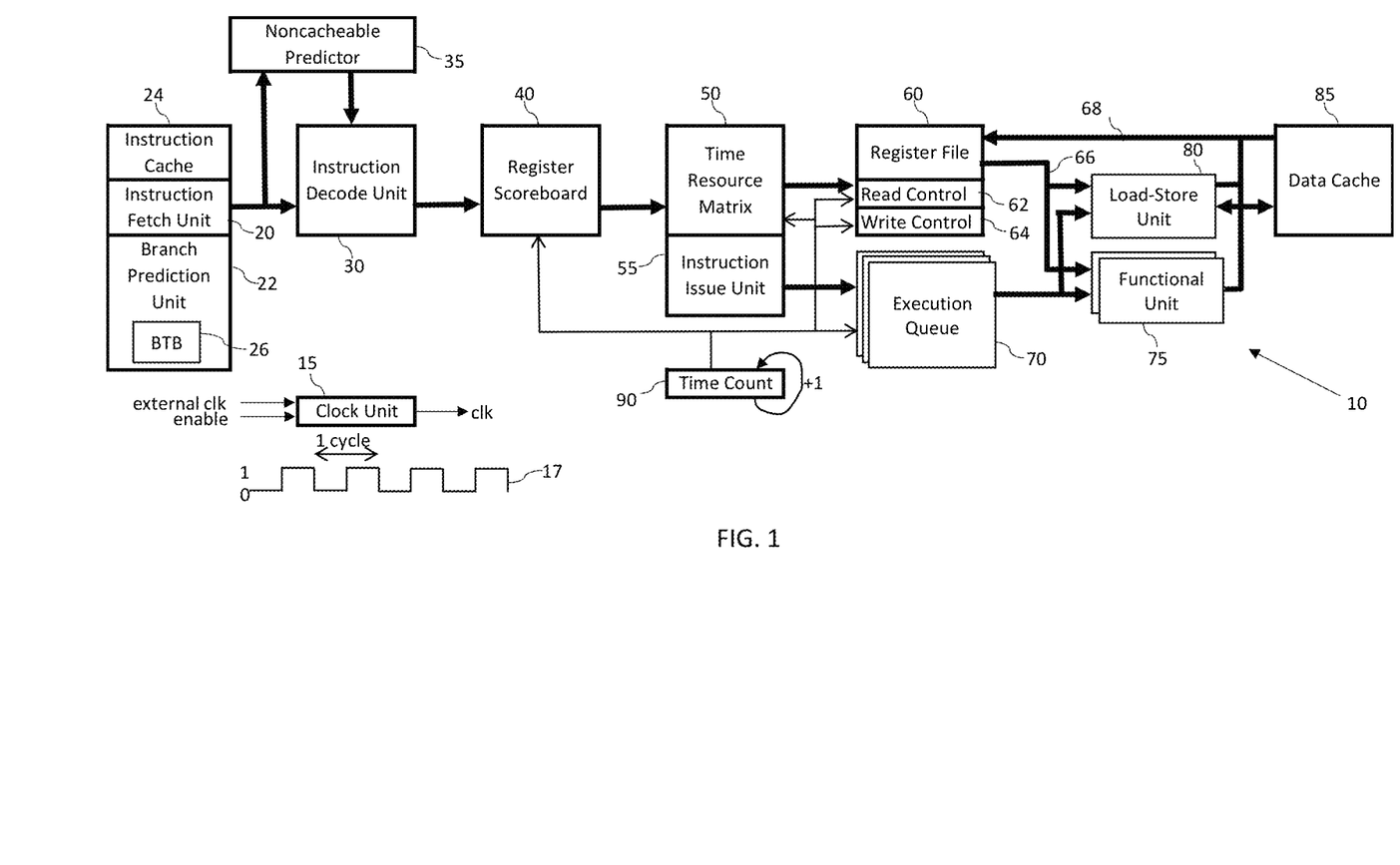
FIG. 1 is a block diagram illustrating a processor based data processing system in accordance with present invention.

FIG. 1 is a block diagram of a microprocessor based data processing system. The exemplary system includes a microprocessor 10 having a clock unit 15, an instruction fetch unit 20, an instruction cache 24, a branch prediction unit 22, an instruction decode unit 30, a non-cacheable predictor 35, a register scoreboard 40, a time-resource matrix 50, an instruction issue unit 55, a register file 60, a read control unit 62, a write control unit 64, a plurality of execution queues 70, a plurality of functional units 75, a load-store unit 80, and a data cache 85. The microprocessor 10 includes a plurality of read buses 66 from the register files to the functional units 75 and load-store unit 80. The system also includes a plurality of write buses 68 to write result data from the functional unit 75, the load-store unit 80, and the data cache 85 to the register file 60. The microprocessor 10 is a synchronous microprocessor where the clock unit generates a clock signal ("elk") which couples to all the units in the microprocessor 10. The clock unit 15 provides a continuously toggling logic signal 17 which toggles between 0 and 1 repeatedly at a clock frequency. Clock output signal ("elk") of clock unit 15 provide a handy to synchronize many different units and states in the microprocessor 10. The clock signal is used to sequence data and instructions through the units that perform the various computations in the microprocessor 10. The clock unit 15 may include an external clock as input to synchronize the microprocessor 10 with external units (not shown). The clock unit 15 may further include an enable signal to disable the clock unit when the microprocessor is in idle stage or not use for instruction execution.

According to an embodiment the microprocessor 10 also includes a time counter unit 90 which stores a time count incremented, in one embodiment, every clock cycle. The time counter unit 90 is coupled to the clock unit 15 and uses "elk" signal to increment the time count.

In one embodiment the time count represents the time in clock cycles when an instruction in the instruction issue unit 55 is scheduled for execution. For example, if the current time count is 5 and an instruction is scheduled to be executed in 22 cycles, then the instruction is sent to the execution queue 70 with the execution time count of 27. When the time count increments to 26, the execution queue 70 issues the instruction to the functional unit 75 for execution in next cycle (time count 27). The time counter unit 90 is coupled to the register scoreboard 40, the time-resource matrix 50, the read control 62, the write control 64, and the plurality of execution queues 70. The scoreboard 40 resolves data dependencies in the instructions. The time-resource matrix 50 checks availability of the various resources which in one embodiment include the read buses 66, the functional units 75, the load-store unit 80, and the write buses 68. The read control unit 62, the write control unit 64, and the execution queues 70 receive the scheduled times from the instruction issue unit 55. The read control unit 62 is set to read the source operands from the register file 60 on specific read buses 66 at a preset time. The write control unit 64 writes the result data from a functional unit 75 or the load-store unit 80 or the data cache 85 to the register file 60 on a specific write bus 68 at a preset time. The execution queue 70 is set to dispatch an instruction to a functional unit 75 or the load-store unit 80 at a preset time. In each case, the preset time is the time setup by the decode/issue unit. The preset time is a future time based on the time count, so when the time count counts up to the preset time, then the specified action will happen, where the specified action is reading data from the register fie, writing data to the register file, or issuing one or more instruction(s) to a functional unit for execution. The decode/issue unit 30 determines that the instruction is free of data dependency and the resource is available to set the "preset time" for the instruction to be executed in the execution pipeline.

In the microprocessor system 10 the instruction fetch unit 20 fetches the next instruction(s) from the instruction cache 24 to send to the instruction decode unit 30. One or more instructions can be fetched per clock cycle from the instruction fetch unit 20 depending on the configuration of microprocessor 10. For higher performance, microprocessor 10 fetches more instructions per clock cycle for the instruction decode unit 30. At the same time, the instruction addresses which are referred to as program counters (PC) of the instructions are sent to the non-cacheable predictor 35 to fetch the non-cacheable time for load instructions. (Determination of the non-cacheable latency time is discussed below.) For low-power and embedded applications, microprocessor 10 might fetch only a single instruction per clock cycle for the instruction decode unit 30. If the instructions are not in the instruction cache 24 (commonly referred to as an instruction cache miss), then the instruction fetch unit 20 sends a request to external memory (not shown) to fetch the required instructions. The external memory may consist of hierarchical memory subsystems, for example, an L2 cache, an L3 cache, read-only memory (ROM), dynamic random-access memory (DRAM), flash memory, or a disk drive. The external memory is accessible by both the instruction cache 24 and the data cache 85. The instruction fetch unit 20 is also coupled to the branch prediction unit 22 for prediction of the next instruction address when the branch is detected and predicted by the branch prediction unit 22. The branch prediction unit 22 includes a branch target buffer (BTB) 26 that stores a plurality of the entry-point addresses, branch types, offsets to exit-point addresses, and the target addresses of the basic blocks which will be discussed in detail later. The instruction fetch unit 20, the instruction cache 24, and the branch prediction unit 22 are described here for completeness of a microprocessor 10. In other embodiments, other instruction fetch and branch prediction methods can be used to supply instructions to the instruction decode unit 30 for microprocessor 10.

The instruction decode unit 30 is coupled to the instruction fetch unit 20 for new instructions and also coupled to the register scoreboard 40. The instruction decode unit 30 decodes the instructions for instruction type, instruction throughput and latency times, and the register operands. The register operands, as an example, may consist of 2 source operands and 1 destination operand. The operands are referenced to registers in the register file 60. The source and destination registers are used here to represent the source and destination operands of an instruction. In one embodiment, the source registers support solving read-after-write (RAW) data dependencies. If a later instruction has the same source register as the destination register of an earlier instruction, then the later instruction has RAW data dependency. The later instruction must wait for completion of the earlier instruction before it can start execution. The register scoreboard 40 is used to keep track of the completion time of the destination registers of the earlier instructions. In the preferred embodiment the completion time is maintained in reference to the time count 90.

Figure 2:
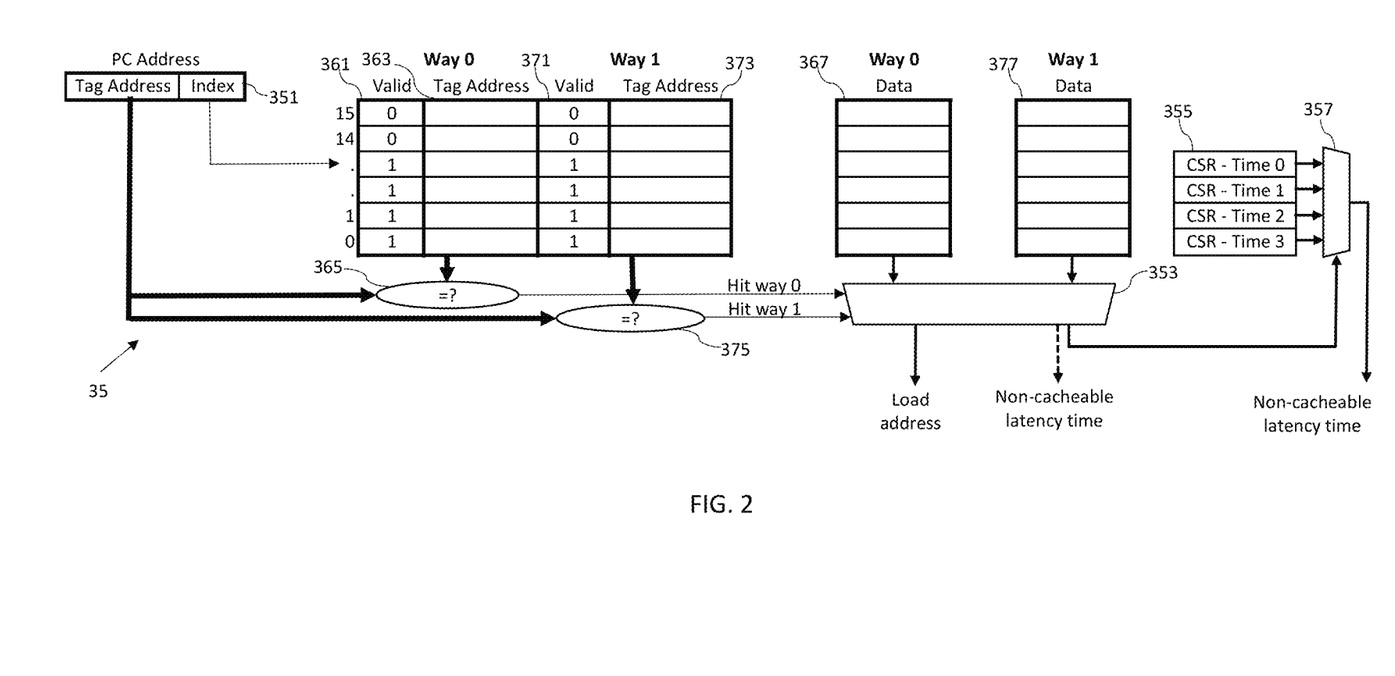
FIG. 2 is a block diagram illustrating non-cacheable prediction for load instructions.

FIG. 2 illustrates details of the non-cacheable predictor 35 for predicting the non-cacheable latency time for load instructions. The instruction addresses of the fetched instructions provided by the instruction fetch unit 20 are used by the non-cacheable latency predictor 35 to provide predicted latency times for non-cacheable load instructions. In one embodiment, the non-cacheable latency times of the predicted load instructions are available at the same time as the normal decoding of the latency time by the instruction decode unit 30. The predicted non-cacheable latency times overrides the decoded latency time for load instructions. Without the non-cacheable predictor 35, the non-cacheable load instructions assume the decoded load latency time which is the latency of a data cache hit. The determination of the load data types is part of the memory address calculation which is performed when accessing the memory management unit (not shown). The memory management unit, which can operate conventionally as part of the load-store unit 80 may consist of a physical memory attribute (PMA) unit and a physical memory protection (PMP) unit which together specify the memory address ranges for different memory types.

Two basic memory data types are cacheable and non-cacheable. The cacheable data can be loaded into the L1 data cache (faster load latency time and the default latency time for all load instructions) and in the hierarchical memory subsystem, which can include for example, an L2 cache, an L3 cache, read-only memory (ROM), dynamic random-access memory (DRAM), flash memory, and/or a disk drive. The non-cacheable load addresses are calculated and validated by the PMA and PMP and may be included in the data arrays 367 and 377 of the non-cacheable predictor 35. The non-cacheable data is data stored in certain input/output devices (not shown) or close-coupled memory (not shown) and specialized memory (not shown) outside of the microprocessor 10 that has been designated as being non-cacheable. The external memory may consist of hierarchical memory subsystems, for example, an L2 cache, an L3 cache, read-only memory (ROM), dynamic random-access memory (DRAM), flash memory, or a disk drive. The PMA and PMP may specify any memory region to be noncacheable. For the non-cacheable loads, the latency times for the non-cacheable memory can have fixed programmable times or be the latency times from past external memory fetch times. In an embodiment, a non-cacheable predictor is used to predict the latency times for non-cacheable load instructions to avoid replaying of load instructions and the subsequent dependent instructions.

The non-cacheable predictor 35 takes the form of a cache structure with a valid array 361, a tag address array 363, a data array 367, and comparator logic 365 for way 0 (described below). The cache arrays are duplicated with the valid array 371, the tag address array 373, the data array 377, and comparator logic 375 for way 1. As an example, the non-cacheable predictor 35 can include 2 sets of 16-entries each with 2-way associativity. The n-way associativity and number of entries are only for illustration purposes. The non-cacheable predictor can be implemented as direct map (1-way associative), or 4-way associative, or fully associative, or any associativity between direct map and fully associative. The direct-map implementation takes the form of a single cache array with 32-entries, the 4-way associative implementation takes the form of 4 sets of 8-entries, and the fully associative implementation takes the form of 32 sets of 1-entry.

The tag address array 363 has a plurality of entries where an entry is addressed by the index portion of the PC address 351 and the content is the tag address portion of the PC address 351. In an example shown by way of FIG. 2, if the PC address is 32 bits, the instructions are 32-bit, and the tag array 363 has 16 entries, then the index portion is 4 bits and the tag address is 26 bits of the PC address 351. A PC address accesses both way 0 and way 1 predictor arrays by comparing the tag address portion of the PC address 351 with 2 entries read from the tag address arrays 363 and 373 for matching. The predictor arrays are used to select the data from the data arrays 367 and 377 through the multiplexer 353. A match in Way 0 will cause the multiplexer 353 to select data from array 367 which corresponds to Way 0 and a match in Way 1 will cause the multiplexer 353 to select data from array 377 which corresponds to Way 1. The data arrays 367 and 377 may consist of the physical load address and the non-cacheable load latency time or the non-cacheable memory type. If the former, then as seen in FIG. 2 the load address and non-cacheable load time are available at the output of the multiplexer 353. If the latter, then the output of the multiplexer 353 represents the non-cacheable memory type and this output is used as a selector to multiplexer 357 to select the appropriate load latency time from affray 355.

When the non-cacheable load is executed for the first time in the load-store unit 80, the PC address of the load instruction, the load address and the latency time for fetching data from external devices are captured in the tag array 363 or 373, and the data array 367 or 377 of the non-cacheable predictor 35, respectively. The way is selected if it is invalid, by random replacement, or by a least-recently-used algorithm for writing a new entry. If the same load instruction is fetched again from the instruction fetch unit 20, then the PC address of the load instruction will match with the previously written entry in the non-cacheable predictor. The non-cacheable latency time from the multiplexor 353 is used as the latency time for the load instruction in the decode unit 30. The non-cacheable latency will be known in the same pipeline stage as the latency time of an instruction that is decoded by the decode unit 30. The non-cacheable latency time will override the decoded latency time of the load instruction. In another embodiment, the non-cacheable predictor 35 can be at an earlier pipeline stage, or be part of the instruction cache 24, or be part of the branch prediction unit 22.

FIG. 2 illustrates another mechanism for fetching the non-cacheable latency time from the non-cacheable predictor 35. In such an embodiment, the non-cacheable latency times are programmable times in the control and status registers (CSRs) 355. The different types of non-cacheable input/output devices and specialized memories are set in the memory management unit (not shown) of the microprocessor 10. These different types of non-cacheable memories will typically have different latency times and are programmed in the latency time CSRs 355. The CSR selectors are stored in the data arrays 367 and 377 instead of the actual non-cacheable latency time. An extra step is needed by the non-cacheable predictor 35 to select a latency time from the latency time CSRs 355 through the multiplexor 357.

In another embodiment, the latency time CSRs 355 are loaded with latency times as determined upon execution of the microprocessor 10. Instead, they are loaded with non-cacheable latency times captured from the latency time exhibited by each non-cacheable memory upon first time execution of the non-cacheable load instruction by the load-store unit 80.

In another embodiment, the data arrays 367 and 377 contain the load physical address in addition to the non-cacheable latency time. The load physical address is immediately used to access the external memory instead of waiting for the normal process of going through instruction issue unit 55, the execution queue 70, and the load-store unit 80. Early access of the non-cacheable load is referred to as prefetching of non-cacheable load. The non-cacheable loads are performed in-order and may be tracked by a re-order buffer (not shown) of the microprocessor 10. The speculative load address from the non-cacheable predictor 35 is validated by comparing to the calculated load address of the non-cacheable load in the load-store unit 80, and by being in the non-cacheable memory region of the PMA and PMP. The load latency time can be a limiting factor and can therefore be crucial in performance of the microprocessor 10. Prefetching of non-cacheable load data can therefore by quite important in the performance of the microprocessor 10. It should be noted that the non-cacheable load predictor 35 may provide prefetching for some but not all non-cacheable loads. The write time of the prefetching of a non-cacheable load instruction is calculated based on the non-cacheable load latency time of the arrays 367 or 377 and the time count 90 at the time of prefetching. The write time of the non-cacheable load remains the same through instruction issue unit 55, the execution queue 70, and the load-store unit 80.

Figure 3:
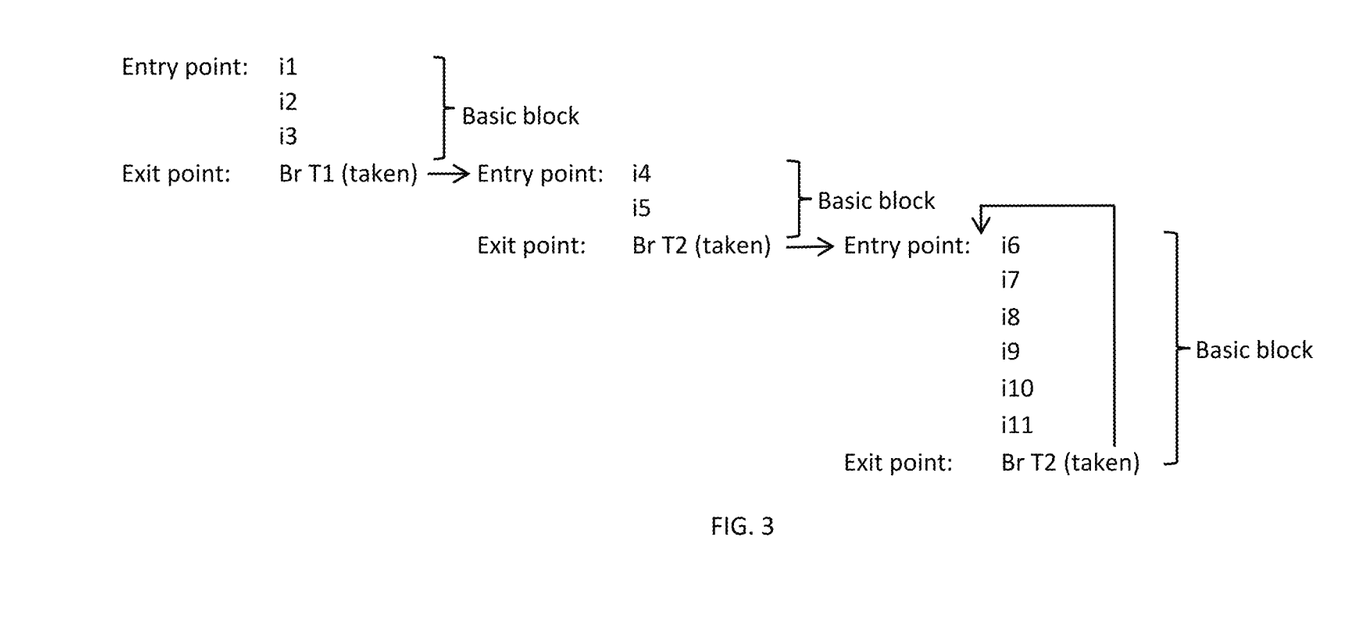
FIG. 3 is a block diagram illustrating a basic block concept for branch prediction.

In one embodiment, the branch prediction unit 22 is implemented with a basic-block algorithm. A basic block is defined as a straight-line code sequence with no branches in except to the entry, and no branches out except at the exit. An example is shown in FIG. 3. In the example of FIG. 3, the first basic block has 4 instructions, the second basic block has 3 instructions, and the third basic block has 7 instructions. The branch target address of the third basic block is the entry point of same basic block, which is an indication of a loop. With basic-block branch prediction, the loop can be detected and marked as such in the branch target buffer. The branch prediction is based on the entry point of the basic block with an offset to the exit point or the location of the taken branch instruction. The entry point address is used to look up in a branch target buffer 26 of the branch prediction unit 22 to predict the target address of the branch instruction at the exit point of the basic block. The target address of the predicted taken branch is the entry point of the next basic block to predict the next target address. An offset from the entry point is included in the branch target buffer 26 to locate the exit point or the branch instruction of the basic block.

In another embodiment, as an alternative to the non-cacheable predictor 35, the non-cacheable prediction can be included in the branch target buffer 26 of the branch prediction unit 22. The non-cacheable load instruction within the basic block can be included in the entry of the branch target buffer 26. The offset from the entry point to the non-cacheable load instruction and the latency time or the selector to the latency time CSRs 355 are included in the entry of the branch target buffer 26.

In another embodiment, the non-cacheable predictor contains the load physical address of the non-cacheable loads. The non-cacheable fetch time is much longer than the data cache hit time. The load physical address is used to start external memory data fetch ahead of time which is referred to as non-cacheable load prefetch. The non-cacheable load prefetch is selective based on past history of any data dependency on non-cacheable stores.

Each of the units shown in the block diagram of FIG. 1 can be implemented in integrated circuit form by one of ordinary skill in the art in view of the present disclosure. With regard to uric embodiment of this invention, time counter 90 is a basic N-bit wrap-around counter incrementing by 1 every clock cycle. The time-resource matrix 50 is preferably implemented as registers with entries read and written as with a conventional register structure.

The integrated circuitry employed to implement the units shown in the block diagram of FIG. 1 may be expressed in various forms including as a netlist which takes the form of a listing of the electronic components in a circuit and the list of nodes that each component is connected to. Such a netlist may be provided via an article of manufacture as described below.

In other embodiments, the units shown in the block diagrams of the various figures can be implemented as software representations, for example in a hardware description language (such as for example Verilog) that describes the functions performed by the units described herein at a Register Transfer Level (RTL) type description. The software representations can be implemented employing computer-executable instructions, such as those included in program modules and/or code segments, being executed in a computing system on a target real or virtual processor. Generally, program modules and code segments include routines, programs, libraries, objects, classes, components, data structures, etc. that perform particular tasks or implement particular abstract data types. The program modules and/or code segments may be obtained from another computer system, such as via the Internet, by downloading the program modules from the other computer system for execution on one or more different computer systems. The functionality of the program modules and/or code segments may be combined or split between program modules/segments as desired in various embodiments. Computer-executable instructions for program modules and/or code segments may be executed within a local or distributed computing system. The computer-executable instructions, which may include data, instructions, and configuration parameters, may be provided via an article of manufacture including a non-transitory computer readable medium, which provides content that represents instructions that can be executed. A computer readable medium may also include a storage or database from which content can be downloaded. A computer readable medium may also include a device or product having content stored thereon at a time of sale or delivery. Thus, delivering a device with stored content, or offering content for download over a communication medium may be understood as providing an article of manufacture with such content described herein.

The aforementioned implementations of software executed on a general-purpose, or special purpose, computing system may take the form of a computer-implemented method for implementing a microprocessor, and also as a computer program product for implementing a microprocessor, where the computer program product is stored on a non-transitory computer readable storage medium and includes instructions for causing the computer system to execute a method. The aforementioned program modules and/or code segments may be executed on suitable computing system to perform the functions disclosed herein. Such a computing system will typically include one or more processing units, memory and non-transitory storage to execute computer-executable instructions.

Figure 4:
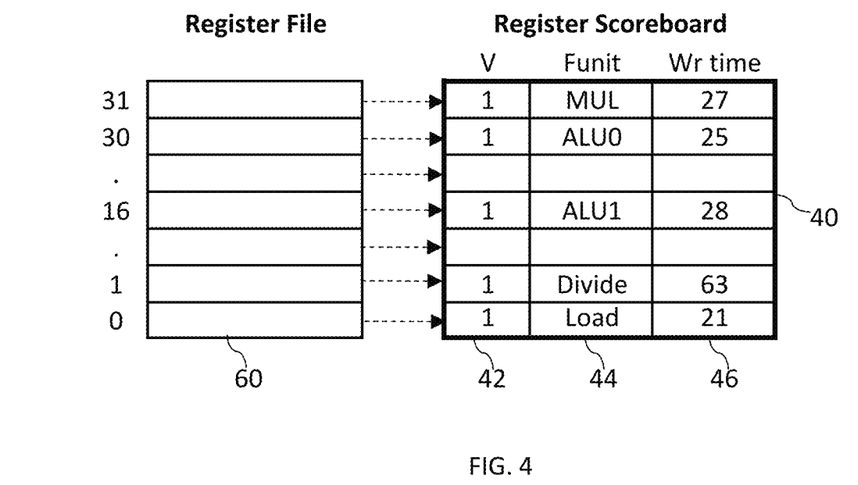
FIG. 4 is a block diagram illustrating a register file and a register scoreboard.

FIG. 4 illustrates the register file 60 and the register scoreboard 40. In one embodiment, the register file 60 has 32 registers, numbered as registers 0 to 31 as illustrated. Each register in the register file 60 has a corresponding entry in the register scoreboard 40. The register scoreboard 40 stores the pending write status for the registers 60. A valid bit field 42 indicates a valid write back to the register file 60 at a future time in reference to the time count 90, as specified by the write time field 46 from a specific functional unit in the "Funit" field 44. As examples illustrated in FIG. 4, register 0 is written back at time count 21 from the load-store unit 80. Register 1 is written back at time count 63 from the divide unit (one of the functional units 75). Register 16 is written back at time count 28 from the ALU1, (another of the functional units 75), etc. as illustrated in FIG. 4. The write time 46 is the time in reference to the time count 90. The result data is written to the register file 60. The data is not available from the register file 60 until the next clock cycle, but the result data can be forwarded from the functional unit 44 in the register scoreboard 40. For example, if the value of the time count 90 is 19, then the load-store unit 80 produces the result data in 2 clock cycles for writing back to the register file 60.

The write time of a destination register is the read time for the subsequent instruction with RAW data dependency on the same destination register. Referring back to FIG. 1, the source registers of an instruction in the instruction decode unit 30 access the register scoreboard 40 for the read times. If the valid bit 42 of a source register is not set in the register scoreboard 40, then the data in the register file 60 and can be accessed at any time providing availability of the read buses 66, otherwise the write time 46 is the earliest time to issue the instruction.

An instruction reads source operand data at read time, executes the instruction with a functional unit 75 at execute time, and writes the result data back to the register file 60 at write time. The write time is recorded in the write time field 46 of the register scoreboard 40. With 2 source registers, the instruction selects the later write time from the register scoreboard 40 as the read time for the instruction. The execute time is the read time plus 1 time count where the functional unit 75 or the load-store unit 80 starts executing the instruction. The write time of the instruction is the read time plus the instruction latency time. If the instruction latency time is 1 (e.g., an ALU instruction), then the write time and execution time of the instruction are the same.

Each instruction has an execution latency time. For example, the add instruction has a latency time of 1, the multiply instruction has a latency time of 2, and the load instruction has a latency time of 3 assuming a data cache hit. In another example, if the current time count is 5 and the source registers of an add instruction receive write time counts of 22 and 24 from the register scoreboard 40, then the read time count is set at 24. In this case, the execution and the write time counts are both 25 for the add instruction. As shown in FIG. 1, the register scoreboard 40 is coupled to the time-resource matrix 50 where the read, execute, and write times of an instruction access the time-resource matrix 50 for availabilities of the resources.

Figure 5:
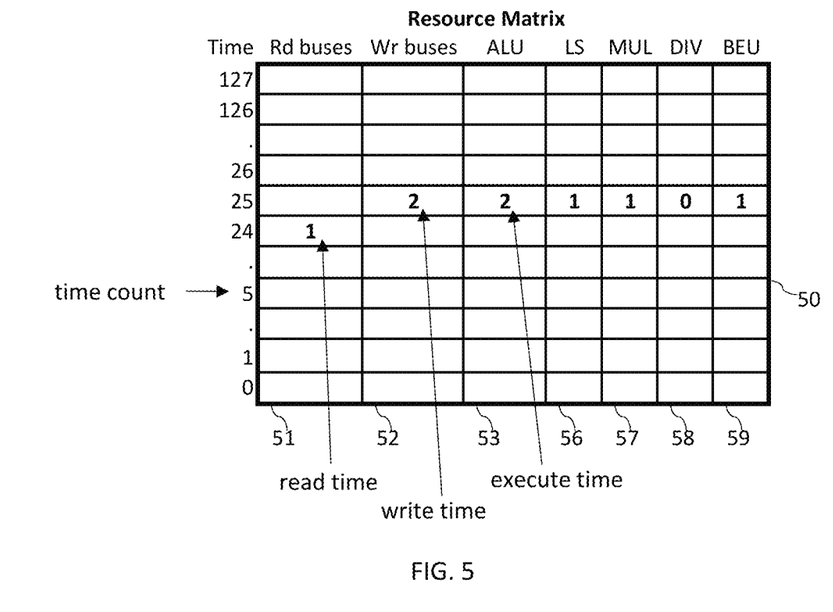
FIG. 5 is a block diagram illustrating a time-resource matrix.

FIG. 5 illustrates the time-resource matrix 50. The time-resource matrix 50 preferably includes the same number of time entries to match the time counter 90. For example, if the time counter 90 is 128 cycles, then the time-resource matrix 50 has 128 entries. The time counter is incremented every clock cycle and rotates back from the 127th entry to the 0th entry. The columns in the time-resource matrix 50 represent the available resources for the read buses 51, the write buses 52, the ALUs 53, the load-store ports 56, the multiply unit 57, the divide unit 58, and the branch execution unit (BEU) 59. If other functional units are provided by microprocessor 10 those are also included in the resource matrix 50.

The read buses column 51 corresponds to the plurality of read buses 66 in FIG. 1. The write buses column 52 corresponds to the plurality of write buses 68 in FIG. 1. The ALUs column 53, the multiply column 57, the divide column 58, and the branch execution unit column 59 correspond to the plurality of functional units 75 of FIG. 1. The load-port ports column 56 corresponds to the load-store unit 80 of FIG. 1.

FIG. 5 also shows an example of the information in the time-resource matrix 50. Shown is data with a read time count of 24, an execution time count of 25, and a write time count of 25. When an instruction accesses the time-resource matrix 50 for availability of resources, the matrix 50 shows that at read time 24, there is 1 available read bus, and at execution time 25, there are 2 available ALUs, 1 load-store port, 1 multiply unit, and 1 BEU for execution of instruction. At write time 25, there are 2 available write buses.

All available resources for the required times are read from the time-resource matrix 50 and sent to the instruction issue unit 55 for a decision of when to issue an instruction to the execution queue 70. If the resources are available at the required times, then the instruction can be scheduled and sent to the execution queue 70. The issued instruction updates the register scoreboard 40 with the write time and updates the time-resource matrix 50 to reduce the available resource values. All resources must be available at the required time counts for the instruction to be dispatched to the execution queue 70. If all resources are not available, then the required time counts are incremented by one, and the time-resource matrix is checked as soon as the same cycle or next cycle. The particular number of read buses 66, write buses 68, and functional units 75 in FIG. 1 is preferably chosen to minimize stalling of instruction in the instruction issue unit 55.

Figure 6A:
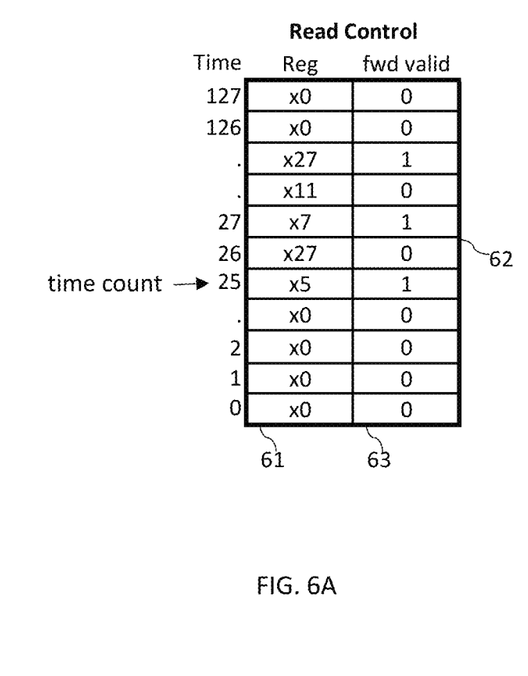
FIGS. 6A and 6B are block diagrams illustrating a read bus control and a write bus control operation.
Figure 6B:
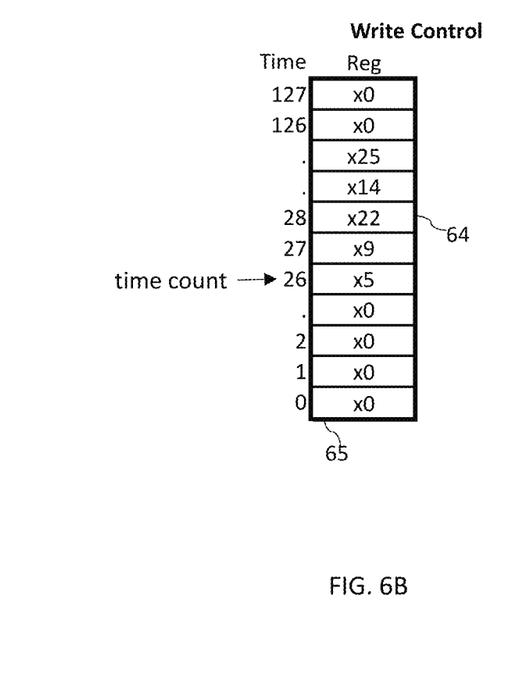

FIG. 6A illustrates a single read bus of the read control unit 62 and FIG. 6B a single write bus of the write control unit 64. The read control unit 62 and the write control unit 64 include a number of time entries to match the time counter 90. As mentioned above, in a preferred embodiment the time count is incremented every clock cycle. The columns in the read control unit 62 represent the source register 61 and a forwarding valid bit register 63. The column in the write control unit 64 represents the destination registers in the write bus 65. In one embodiment, microprocessor 10 uses the RISC-V instruction set architecture. In that architecture register 0 (x0) is not a real register; reading of register x0 returns 0 and writing to register x0 is ignored. The x0 register is used as an invalid read and write to the register file 60. If a different instruction set architecture is used, then the read control unit 62 and the write control unit 64 include another column of valid bits (not shown) to indicate a valid read or write, respectively.

In the example illustrated in FIGS. 6A and 6B, at the time count of 25 the forward valid bit 63 of the read control unit 62 is set "on" and the data will be forwarded from a functional unit, not from the register file 60. The register x5 from the register field 61 of the read control 62 is used to read the entry 5 from the register scoreboard 40 for the "Funit" 44 which is used for forwarding. In the next cycle, when the time count is 26, the register x27 from the register field 61 is used to read from the register file 60. The read control unit 62 is responsible for supplying the source operand data on a specific one of the read buses 66. The execution queue 70 keeps the information of which one of the read buses 66 is to receive source operand data. The execution queues 70 and read control unit 62 are synchronized based on the time-resource matrix 50. The read control unit 62 provides centralized control for the read buses 66, thus reducing complexity from the hundreds of instructions in dynamic scheduling. Similarly in FIG. 6B, the register x5 from the register field 65 of the write control unit 64 at time count of 26 is used to write to the register file 60. The register x5 will also access the "Funit" 44 of the register scoreboard 40 to get the result data from a specific functional unit 75. Again, the execution queues 70 the functional units 75, and the write control unit 64 are synchronized to transfer result data on a write bus 68 to write to the register file 60. The write control unit 64 is the centralized control for the write buses 68 which removes complexity compared to the plurality of functional units in dynamic scheduling.

Figure 7:
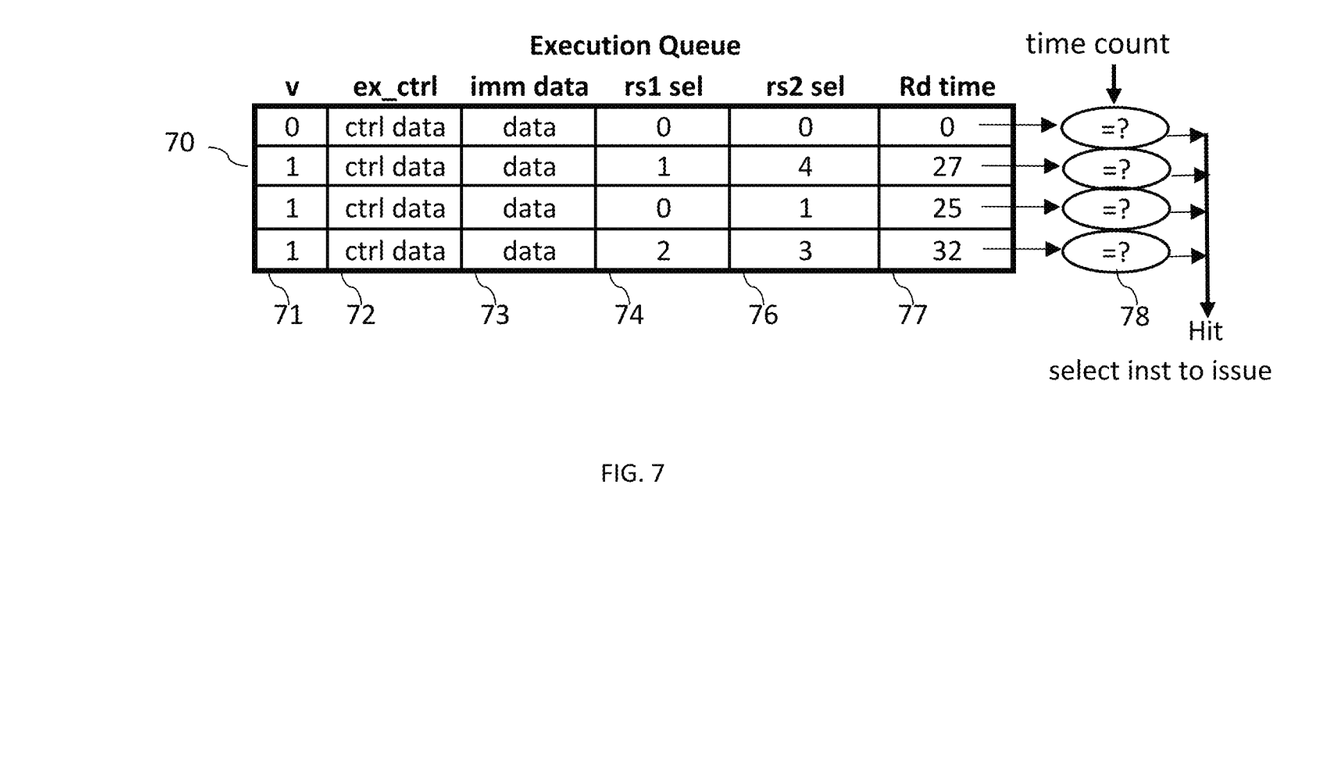
FIG. 7 is a block diagram illustrating an execution queue.

FIG. 7 illustrates an example of a 4-entry execution queue 70. The number of entries for the execution queue 70 is only an illustration. The invention is not limited to any number of execution queue 70 entries and the execution queue 70 could take the form of a single-entry execution queue. Each entry is an instruction waiting for execution by one of the functional units 75 or the load/store unit 80 according to the time count in the read time column 77. Each entry in the execution queue 70 preferably consists of the following fields: the valid bit 71, control data 72, the immediate data 73, the first source register select 74, the second source register select 76, and the read time 77. The valid bit 71 indicates that the entry is valid in the execution queue 70. The control data 72 specifies the specific operation to be used by the functional units 75 or the load/store unit 80. The immediate data 73 is an alternative to the second source register for the instruction. The valid indication for the immediate data 73 may be included in the control data field 72. Most instructions have an option to use immediate data 73 instead of data from the second source register. The first source register select 74 identifies which one of the read buses 66 has the operand data for the first source register. The second source register select 76 identifies which one of the read buses 66 has the operand data for the second source register. The source register selects 74 and 76 may not be used for some instructions.

Note that the destination register can be but does not need to be kept with the instruction. The write control unit 64 is responsible for directing the result data from a functional unit 75 to a write bus 68 to write to the register file 60. The execution queues 70 are only responsible for sending instructions to the functional units 75 or the load-store unit 80. The read time field 77 which has the read time of the instruction is synchronized with the read control unit 62. When the read time 77 is the same as the time count 90 as detected by the comparators 78, the instruction is issued to the functional units 75 or the load/store unit 80. For the example in FIG. 7, the entries are issued to the functional units out-of-order. The read time field 77 indicates that the second entry is issued at time count 25, the third entry is issued at time count 27, and the first entry is issued at time count 32.

In an embodiment, each functional unit 75 has its own execution queue 70. In another embodiment, an execution queue 70 dispatches instructions to multiple functional units 75. In this case, another field (not shown) can be added to the execution queue 70 to indicate the functional unit number for dispatching of instructions.

Referring back to FIG. 1, the execution queues 70 are coupled to the load store unit (LSU) 80 and the functional units 75. The execution queues 70 issue the instructions to the functional units 75 or the load/store unit 80 when the read times 77 are the same as the time count 90. If the instruction is a load/store, then it is dispatched to the LSU 80, else it is dispatched to one of the functional units 75. The LSU 80 and functional units 75 are also coupled to the read buses 66 and write buses 68 to access the register file 60. The source operand data are fetched from register file 60 and transported on read buses 66 to the LSU 80 and functional units 75. The result data from the LSU 80 and functional units 75 are transported on write buses 68 to write to destination registers in the register file 60. The LSU 80 is also coupled to the data cache 85. The LSU 80 executes the load and store instructions to read and write data from the data cache 85. If the data are not in the data cache 85, then the cache miss causes that cache line to be fetched from external memory (not shown). Typically, the functional units 75 perform different operations, e.g., ALU, multiply, divide, branch, etc. In other embodiments, the functional units 75 perform the same function, for example, multiple ALUs. Furthermore, the invention is not limited to integer functional units. In other embodiments the functional units include floating point units, digital-signal processing units, vector processing units, or custom designed units.

The foregoing explanation described features of several embodiments so that those skilled in the art may better understand the scope of the invention. Those skilled in the art will appreciate that they may readily use the present disclosure as a basis for designing or modifying other processes and structures for carrying out the same purposes and/or achieving the same advantages of the embodiments herein. Such equivalent constructions do not depart from the spirit and scope of the present disclosure. Numerous changes, substitutions and alterations may be made without departing from the spirit and scope of the present invention.

Although illustrative embodiments of the invention have been described in detail with reference to the accompanying drawings, it is to be understood that the invention is not limited to those precise embodiments, and that various changes and modifications can be affected therein by one skilled in the art without departing from the scope of the invention as defined by the appended claims.

What is claimed is:

1. A processor comprising:
   a time counter comprising an N-bit counter that generates a time count representing a current time of the processor, wherein the time count is incremented with each cycle of a clock circuit, the time counter counting from a zero count value to an N-bit count value, which represents a largest future time for an instruction unit to issue an instruction, and, wherein the N-bit counter returns to the zero count value after reaching the N-bit count value;
a register scoreboard coupled to the time counter to record a write time for each register in a register file, one of the write times in the register scoreboard including a write back time of a destination register in the register file referenced by a first non-cacheable load instruction where each write time in the register scoreboard is a future time based on the time counter;
an instruction issue unit that receives the first non-cacheable load instruction, and that issues the first non-cacheable load instruction with a write time at a future time count that is stored in the register scoreboard and that corresponds to a non-cacheable latency time;
a branch target buffer (BTB) storing target addresses of basic-blocks, wherein one of the basic-blocks includes the first non-cacheable load instruction;
a plurality of control and status registers (CSRs) each storing a different latency time corresponding to a non-cacheable memory type;
wherein an entry in the BTB includes the first non-cacheable load instruction and a selector to select one of the CSRs, wherein the selected CSR is used for predicting the non-cacheable latency time of the first non-cacheable load instruction; and
an execution queue coupled to the instruction issue unit to receive the first non-cacheable load instruction from the instruction issue unit and dispatch the first non-cacheable load instruction to a load-store unit.

2. The processor of claim 1 wherein:
the BTB comprises a plurality of basic-block entries that are each addressed by a corresponding entry point address;
wherein a location of the first non-cacheable load instruction is an offset from one of the corresponding entry point addresses.

3. The processor of claim 2 further comprising an instruction decode unit that is coupled to the register scoreboard and that:
uses a write time for each source operand to determine an execution time for a particular instruction;
decodes the particular instruction to determine a latency time corresponding to the particular instruction; and
uses the write time for each source operand and latency time of the particular instruction to determine a write time for the particular instruction.

4. The processor of claim 3, wherein the non-cacheable latency time of the first non-cacheable load instruction is used to determine a write time for the particular instruction instead of the latency time determined for the particular instruction.

5. The processor of claim 4 further comprising:
a time-resource matrix unit coupled to the register scoreboard and the time counter for storing information relating to available resources for each time count of the time counter;
wherein the available resources include at least one of: a plurality of read buses, a plurality of write buses, and a plurality of functional units;
wherein the instruction issue unit is coupled to the time-resource matrix unit to receive data therefrom to issue a second instruction if all resources specified for the second instruction in the time-resource matrix are available, and to stall the second instruction if any of the resources specified for the second instruction is not available;
a read control unit storing a read register of the register file with time count entries and for each register therein, storing a forwarding valid bit to indicate when the corresponding register may be read and transported on a read bus;
a write control unit storing a write register of a register file with time count entries to indicate when result data are transported from a write bus and written to a register of the register file;
wherein the execution queue stores a plurality of instructions and for each of the plurality of instructions stores a read time which is a future time based on a time count of the time counter;
wherein the read control unit is synchronized with each read time stored in the execution queue; and
wherein the execution queue dispatches instructions to at least one functional unit.

6. A processor comprising:
a time counter storing a time count representing a current time of the processor, wherein the time count is incremented with each cycle of a clock circuit;
an instruction issue unit coupled to the time counter for receiving a first non-cacheable load instruction associated with a non-cacheable latency time, and issuing the first non-cacheable load instruction with a preset execution time based on the time count;
a branch target buffer (BTB) storing target addresses of basic-blocks, wherein one of the basic-blocks includes the first non-cacheable load instruction;
a plurality of control and status registers (CSRs) each storing a different latency time corresponding to a non-cacheable memory type;
wherein an entry in the BTB includes the first non-cacheable load instruction and a selector to select one of the CSRs, wherein the selected CSR is used for predicting the non-cacheable latency time of the first non-cacheable load instruction;
an execution queue coupled to the time counter and the instruction issue unit, to receive the first non-cacheable load instruction from the instruction issue unit, and dispatch the first non-cacheable load instruction to a load-store unit when the preset execution time is correlated to the time count;
a register scoreboard storing a write time of a register in a register file, wherein the write time is a first future time based on the time count;
an instruction decode unit that decodes a first instruction to determine a source operand and a latency time of the first instruction and sends the source operand and the latency time of the first instruction to the register scoreboard, wherein the register scoreboard records write times for source operands of the first instruction and uses the write times to determine an execution time for the first instruction, wherein the execution time is a second future time based on the time count;
a time-resource matrix coupled to the register scoreboard and the time counter, the time-resource matrix storing information relating to available resources for each value of the time counter; and
wherein the available resources include at least one of: a plurality of read buses, a plurality of write buses, and a plurality of functional units.

7. A computer program product for issuing an instruction, the computer program product stored on a non-transitory computer readable storage medium and including computer system instructions for causing a computer system to execute a method comprising:
  recording into a register scoreboard that is coupled to a time counter that increments with each clock cycle of a clock circuit, a write time for each register in a register file, where one of the write times includes a write back time of a destination register in the register file referenced by a first non-cacheable load instruction where each write time in the register scoreboard is a future time based on the time counter; and
  issuing the first non-cacheable load instruction to an execution queue in a processor, the first non-cacheable load instruction characterized by a write time that is obtained from the register scoreboard that corresponds to a non-cacheable latency time;
  predicting the non-cacheable latency time by accessing an entry in a branch target buffer (BTB), wherein the BTB stores target addresses of basic-blocks, wherein one of the basic-blocks includes the first non-cacheable load instruction and wherein the entry in the BTB includes the first non-cacheable load instruction and a selector to select one of a plurality of control and status registers (CSRs) each storing a different latency time corresponding to a non-cacheable memory type; and
  using the selected CSR to predict the non-cacheable latency time of the first non-cacheable load instruction.

8. The computer program product of claim 7, wherein the method further comprises:
  converting an instruction address of the first non-cacheable load instruction from an offset of an entry point address of a basic-block.

9. The computer program product of claim 8, wherein the method further comprises:
  storing information corresponding to available resources for a plurality of time counts generated by the time counter in a time-resource matrix, wherein the resources comprise at least one of a plurality of read buses, a plurality of write buses, and a plurality of functional units;
  controlling a read bus by way of a read control unit to read contents of a first register of the register file;
  controlling a write bus by way of a write control unit to write to a second register of the register file;
  storing a plurality of processor instructions in an execution queue, wherein each of the plurality of processor instructions includes a read time based on the time counter; and
  synchronizing the read time stored in the execution queue with the read control unit;
  wherein the execution queue is configured to dispatch the processor instructions to a single functional unit or to multiple functional units.

* * * * *